(12) United States Patent
Momtchilov et al.

(10) Patent No.: US 7,702,750 B2
(45) Date of Patent: Apr. 20, 2010

(54) SYSTEM AND METHOD FOR EVENT DETECTION AND RE-DIRECTION OVER A NETWORK USING A PRESENTATION LEVEL PROTOCOL

(75) Inventors: Georgy Momtchilov, Coconut Creek, FL (US); Ryan Best, Wellington, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 922 days.

(21) Appl. No.: 10/711,647

(22) Filed: Sep. 29, 2004

(65) Prior Publication Data

US 2006/0069750 A1    Mar. 30, 2006

(51) Int. Cl.
*G06F 15/16* (2006.01)
(52) U.S. Cl. .............. 709/219; 709/223; 709/224; 709/203; 709/204; 709/227
(58) Field of Classification Search ........... 709/219, 709/228, 318, 322, 223–224, 203–204, 227
See application file for complete search history.

(56) References Cited

U.S. PATENT DOCUMENTS

| | | | | |
|---|---|---|---|---|
| 6,982,656 | B1* | 1/2006 | Coppinger et al. | 340/988 |
| 7,039,828 | B1* | 5/2006 | Scott | 714/4 |
| 7,171,478 | B2* | 1/2007 | Lueckhoff et al. | 709/227 |
| 2002/0114004 | A1* | 8/2002 | Ferlitsch | 358/1.15 |
| 2002/0159419 | A1* | 10/2002 | Morris | 370/338 |
| 2003/0200254 | A1 | 10/2003 | Wei | |
| 2005/0091302 | A1* | 4/2005 | Soin et al. | 709/200 |
| 2006/0075106 | A1* | 4/2006 | Hochmuth et al. | 709/227 |

FOREIGN PATENT DOCUMENTS

| | | | |
|---|---|---|---|
| EP | 1187022 | * | 3/2002 |
| EP | 1187022 | A | 3/2002 |
| EP | 1376927 | A | 1/2004 |

OTHER PUBLICATIONS

International Search Report related to PCT/US2005/020172.
Ramamurthy S, Et Al., Institute Of Electrical And Electronics Engineers: "Optimising Thin Clients For Wireless Computing Via Localization Of Keyboard Activity," Conference Proceeding Of The 2001 IEEE International Peformacen, Computing, And Communications Conference (IPCCC), Phoenix, AZ, Apr. 4-6, 2001, IEEE International Peformance, Computing And Communications Conference, New York, NY: IEEE, US, vol. Conf. 20, Apr. 4, 2001, pp. 249-252, XP001049959, ISBN: 0-7803-7001-5, the whole document.

* cited by examiner

*Primary Examiner*—Kevin Bates
*Assistant Examiner*—Hua Fan
(74) *Attorney, Agent, or Firm*—Choate, Hall & Stewart, LLP

(57) ABSTRACT

A mechanism for detecting events generated from a device in communication with a client system and the re-direction of those events to a server system over a network using a presentation-level protocol is disclosed. Plug and play events are detected at the client system, bound to a virtual connection for a user session, and re-directed for handling to a server-based system using the presentation-level protocol. The server-based system maps the device to the user session. Applications which have registered a callback with the session are informed and generate an appropriate message which is transmitted to the device in communication with the client system via a specified virtual communication connection in the user session.

16 Claims, 13 Drawing Sheets

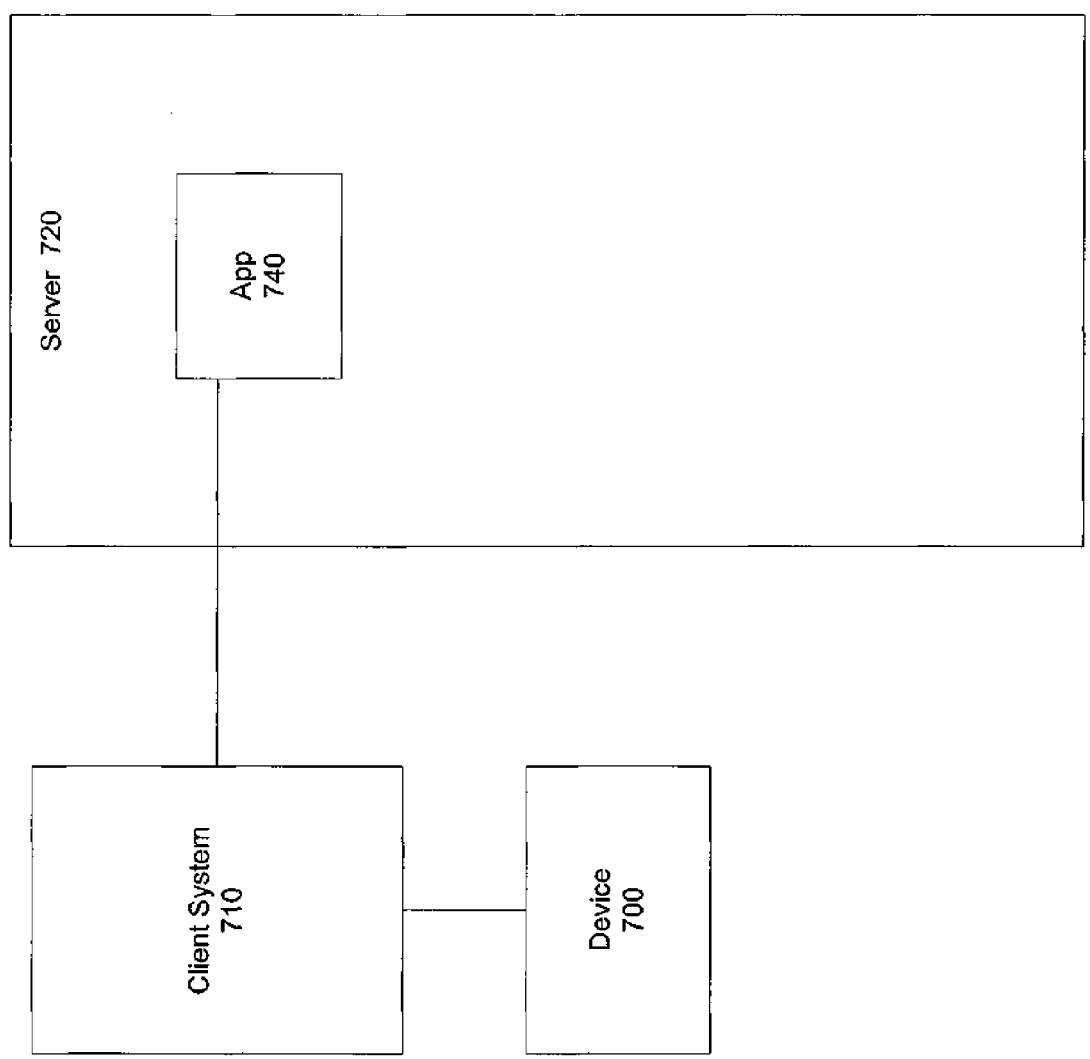

SYSTEM AND METHOD FOR EVENT DETECTION AND RE-DIRECTION OVER A NETWORK USING A PRESENTATION LEVEL PROTOCOL

FIELD OF THE INVENTION

The illustrative embodiment of the present invention relates generally to event detection at a client system, and more specifically to the re-direction to a server system of Plug and Play events generated by a device communicating with a client system.

BACKGROUND OF THE INVENTION

Plug and Play (PnP) is a combination of hardware and software support that enables a computer system to recognize and adapt to hardware configuration changes in devices/components interfaced with the system with little or no user intervention. With Plug and Play, a user can add or remove devices dynamically, without manual configuration and without any intricate knowledge of computer hardware. For example, a user can dock a PDA or laptop and use the docking station's Ethernet card to connect to a network without changing the configuration settings for the connected device. Subsequently, the user can undock the same PDA or laptop and use a modem to connect to the network without having to make any manual configuration changes.

Plug and play events for devices connected to a computer are typically handled by the operating system of the system with which the device is communicating. For example, a PDA tethered to a PC would have its events handled by the PC OS. The system is able to automatically load and unload device drivers to reflect the different devices attached to the system when they are docked or undocked. Also, applications are able to automatically adjust their configurations to reflect the insertion or removal of devices, e.g., PDAs. Plug and Play allows a user to change a computer's configuration with the assurance that all devices will work together and that the machine will boot correctly after the changes are made.

Unfortunately, the conventional method of handling Plug and Play events (such as "device arrival" and "device removal") does not work particularly well where the new device is communicating with a client system connected to a server in a server-based computing system. The client system in a server-based computing system is frequently in contact with the server system over a network via a presentation level protocol supporting a user session executing on the server. The server system deploys, manages, supports and executes applications on the servers thereby relieving the client system of the need to host and execute the applications. The server deploys a presentation level protocol and architecture such as the Independent Computing Architecture (ICA) from Citrix Systems Inc. of Fort Lauderdale, Fla., the Remote Desktop Protocol (RDP) from Microsoft Corporation of Redmond, Wash. and the X-Window Protocol from the X-Open Consortium. A user connected to the client system who wishes to execute an application or access resources on the server is connected in a dedicated session to the server. Conventionally however, the Plug and Play manager for the operating system of the client system handles any messages generated by devices connecting to, or removing from, the client system and the generated events do not impact the existing user session.

BRIEF SUMMARY OF THE INVENTION

The illustrative embodiment of the present invention provides a mechanism for detecting events generated from a device in communication with a client system and re-directing those events to a server system over a network using a presentation-level protocol. Plug and play events are detected at the client system, bound to a virtual connection for a user session, and re-directed for handling to a server-based system using the presentation-level protocol. The server-based system maps the device in the user session. Applications which have registered a callback with the session are informed and generate an appropriate message which is transmitted to the device in communication with the client system via a specified virtual communication connection in the user session.

In an embodiment, a method for handling plug and play events occurring at a client provides a client communicating with a server over a network using a presentation-level protocol. The method also detects a plug and play event notification regarding a device in communication with the client. The method redirects the event notification to a server. The method then receives from the server a command directed to the device.

In another embodiment, a method for handling plug and play events occurring at a client communicating with a server using a presentation-level protocol includes the step of receiving from a client a plug and play notification regarding a device in communication with the client. The method also notifies an application program hosted by the server of the occurrence of the event notification. The method further includes the step of receiving from the application program hosted by the server a command directed to the device. The command directed to the device is then transmitted to the client.

In one embodiment, for handling events occurring at a client in communication with a server using a presentation-level protocol includes the step of receiving from a client an event notification regarding a device in communication with the client. The method also notifies an application program hosted by the server of the occurrence of the event notification. The method further includes the step of receiving from the application program hosted by the server a command directed to the device. The command directed to the device is then transmitted to the client.

In a different embodiment, a method for informing a server about the presence of devices connected to a client communicating with the server using a presentation-level protocol includes the step of emulating a plug and play event notification regarding a device in communication with the client. The method also includes the step of redirecting the emulated event notification to a server. The method further includes the step of receiving from the server a command directed to the device in communication with the client.

In one embodiment, a method for enumerating devices communicating with a client that have been mapped into a session on a server includes the steps of launching an application in a user session on a server. The method also includes the steps of intercepting device enumeration methods in the server-based user session and redirecting the device enumeration methods to a control virtual driver on the server. The method also emulates an arrival event for at least one device enumerated by the redirected method. The device for which the arrival event is emulated is a device in communication with a client system that was mapped into the user session prior to said application launch. The method also notifies the application hosted by the server that an event notification has been occurred.

In another embodiment, a method for handling plug-and-play events occurring at a client includes the step of detecting a plug-and-play event notification regarding a device communicating with the client via a USB connection. The method further redirects the event notification to a server over a network. Subsequent to the redirection of the event notification to the server, the method includes the step of receiving a command directed to the device from the server.

BRIEF DESCRIPTION OF THE DRAWINGS

These and other aspects of this invention will be readily apparent from the detailed description below and the appended drawings, which are meant to illustrate and not to limit the invention, and in which:

FIG. 9C depicts a block diagram of an embodiment of the present invention implemented without the use of a presentation-level protocol supporting architecture.

DETAILED DESCRIPTION OF THE INVENTION

The illustrative embodiment of the present invention detects plug and play events generated by devices in communication with a client system to be redirected to an existing session on a server for handling. The device generating the event is mapped to the existing user session. Applications which have registered a callback with the session are informed and generate a message based on the type of event. The message is transmitted to the device in communication with the client system via a specified virtual communication connection in the user session.

Figure 1A:
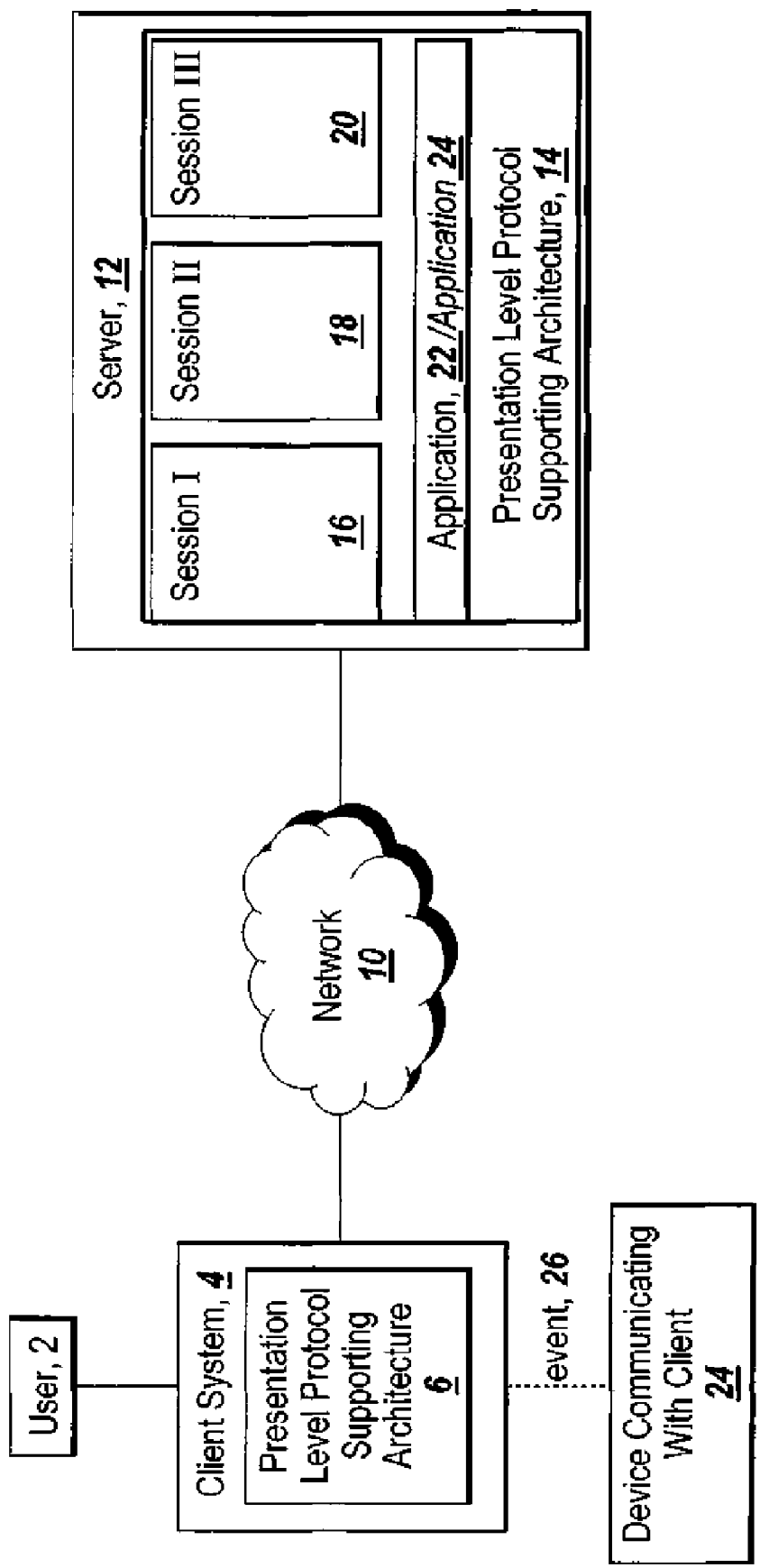
FIG. 1A is a block diagram of an embodiment of an environment suitable for practicing the illustrative embodiment of the present invention.

FIG. 1A depicts an environment suitable for practicing an embodiment of the present invention. A user 2 has access to a client system 4. The client system 4 includes a presentation-level protocol supporting architecture 6 such as ICA, RDP or X-Open Windows. The presentation-level protocol supporting architecture 6 is used to establish a connection over a network 10 with a presentation-level supporting architecture 14 included on a server 12. The presentation-level protocol supporting architecture 14 establishes user sessions, session I (16), session II (18) and session III (20). Requests from a user 2 are mapped into the appropriate session. Those skilled in the art will recognize that a single user may establish multiple sessions. Alternatively, multiple users may establish individual sessions 16, 18 and 20 on the server 12. Each session 16, 18 and 20 may include instances of one or more applications 22 and 24 available to handle client system 4 requests. A device 24 in communication with the client system 4 may generate an event 26 which is intercepted and redirected to a session 16, 18 and 20 for handling. The device 24 in communication with the client system 4 may take many forms. The device 24 may be a printer, scanner, digital camera, mobile phone, PDA, or other device exporting a serial communication interface capable of communicating with the client system 4.

Figure 1B:
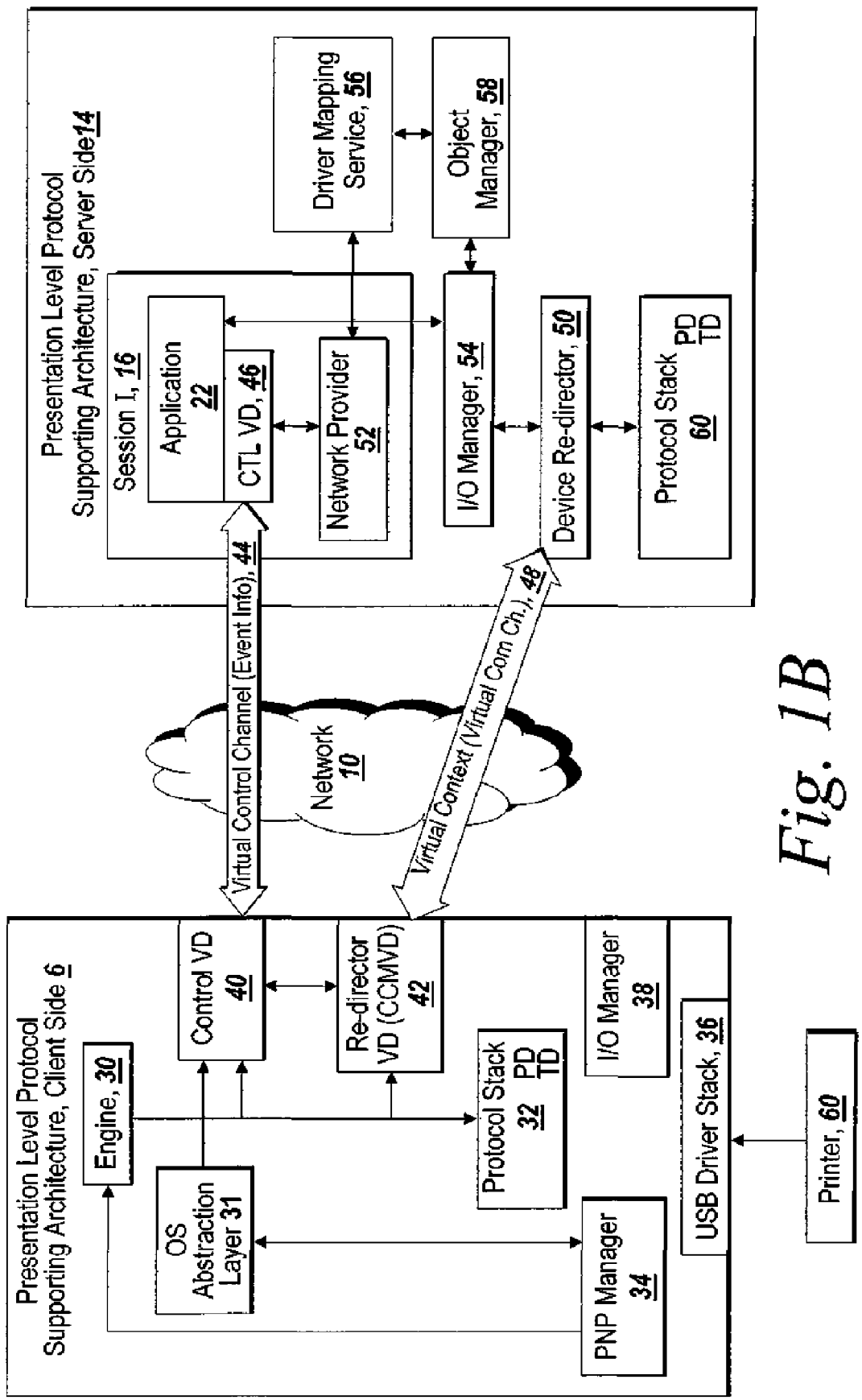
FIG. 1B is a block diagram depicting the environment of FIG. 1A in more detail.

Portions of the environment depicted in FIG. 1A are shown in more detail in FIG. 1B. An exemplary Presentation Level Protocol Supporting Architecture 6 on the client side includes an engine 30 and Protocol Stack 32. The Protocol Stack 32 includes a Protocol Driver (PD), and Transport Driver (TD). The Presentation Level Protocol Supporting Architecture 6 also includes an OS Abstraction Layer 31, a Plug and Play Manager 34, a USB driver stack 36 and an I/O manager 38. The Presentation Level Protocol Supporting Architecture 6 further includes a control virtual driver (CTL VD) 40, used to transmit control information over a virtual control connection 44 to and from the server 12, and a Redirector virtual driver/Client COM Mapping Virtual Driver (CCM VD) 42 which is used to transmit data over a virtual communication connection 48 to and from a server 12. The CTL VD 40 registers a callback for certain events with the OS abstraction layer 31. The callback is a standing request left with the OS abstraction layer 31 by the CTL VD 40 to execute a particular instruction (such as notifying the CTL VD) in the case of the occurrence of a specified event. The OS abstraction layer 31 intercepts events generated by the PNP Manager 34 such as device arrival events generated by a printer 60 connecting to USB driver stack 36. The callback to the CTL VD 40 that is executed sends information to the server about the printer 60 and the event as set forth below in more detail.

Although FIG. 1B depicts a printer 60 communicating with the client-side Presentation Level Protocol Supporting Architecture 6 via a USB driver stack 36, it should be understood that many other implementations are possible within the scope of the present invention. For example the device 24 communicating with the client system 4 may be any device exporting a serial interface. Accordingly, the device 24 communicating with the client system 4 may communicate using an IR serial protocol, a Bluetooth serial protocol, the IEEE 1394 protocol, FIREWIRE, the WI-FI protocol, the USB protocol, or other wireless protocol as long as the client system 4 supports communications with the device 24 using the particular protocol.

The server 12 includes the server-side of the presentation level protocol supporting architecture 14 depicted in FIG. 1B. The server-side of the presentation level protocol supporting architecture 14 supports multiple user sessions 16, 18 and 20. The depicted user session I (16) includes a server-side CTL VD 46 used to establish a virtual channel 44 with the client-side CTLVD 40 in order to transmit control information between the client system and the server. Session I (16) also includes one or more applications 22 and 24 such as the depicted instance of the application 22 which may act as a resource for the printer 60. Separate instances of application 22 run as separate processes within each user session. Alternatively, the application 22 may be a synchronizing application, such as ACTIVESYNC from Microsoft Corporation, or HOTSYNC from PalmOne, Inc. of Milpitas, Calif. Those skilled in the art will recognize that Session I (16) may include many different types of applications in addition to/in place of synchronization applications without departing from the scope of the present invention.

Session I (16) also includes a Network Provider module 52 which makes an RPC call to a driver mapping service as part of the process of mapping virtual devices into a user session. The mapping process is discussed in more detail below. The Network Provider module 52 is in contact with the driver mapping service 56, which communicates with the Object Manager 58. The Driver Mapping Service 56 and the Object Manager 58 are also part of the Presentation-Level Protocol Supporting Architecture 14 but located outside the session 16. The application 22 communicates with the I/O Manager 54. The I/O Manager 54 communicates with the Object Manager 58 and the Device Redirector 50. The Device Redirector 50 is used to form a virtual communication channel 48 with the client-side CCM VD 42 for transmitting data. Also included in the Presentation Level Protocol Supporting Architecture 14 is a server-side Protocol Stack 60 including a PD and TD. The operations of the server-side components depicted in FIG. 1B are discussed in more detail below.

Those skilled in the art will recognize that the actual components in the Presentation Level Protocol Supporting Architectures 6 and 14 will vary depending upon the architecture deployed. In the ICA architecture the protocol stacks 32 and 60 are ICA stacks. The OS Abstraction Layer 31 is a WINDOWS Abstraction Layer. Similarly, the Object Manager 58 is a WINDOWS Object Manager, the client-side Presentation Level Protocol Supporting Architecture 6 is an ICA client, and the server-side Presentation Level Protocol Supporting Architecture 14 is a METAFRAME PRESENTATION SERVER in an ICA architecture. It will also be recognized that the components of an RDP architecture, X-Open architecture or other presentation level protocol supporting architecture may vary from the components depicted herein without departing from the scope of the present invention.

Figure 2A:
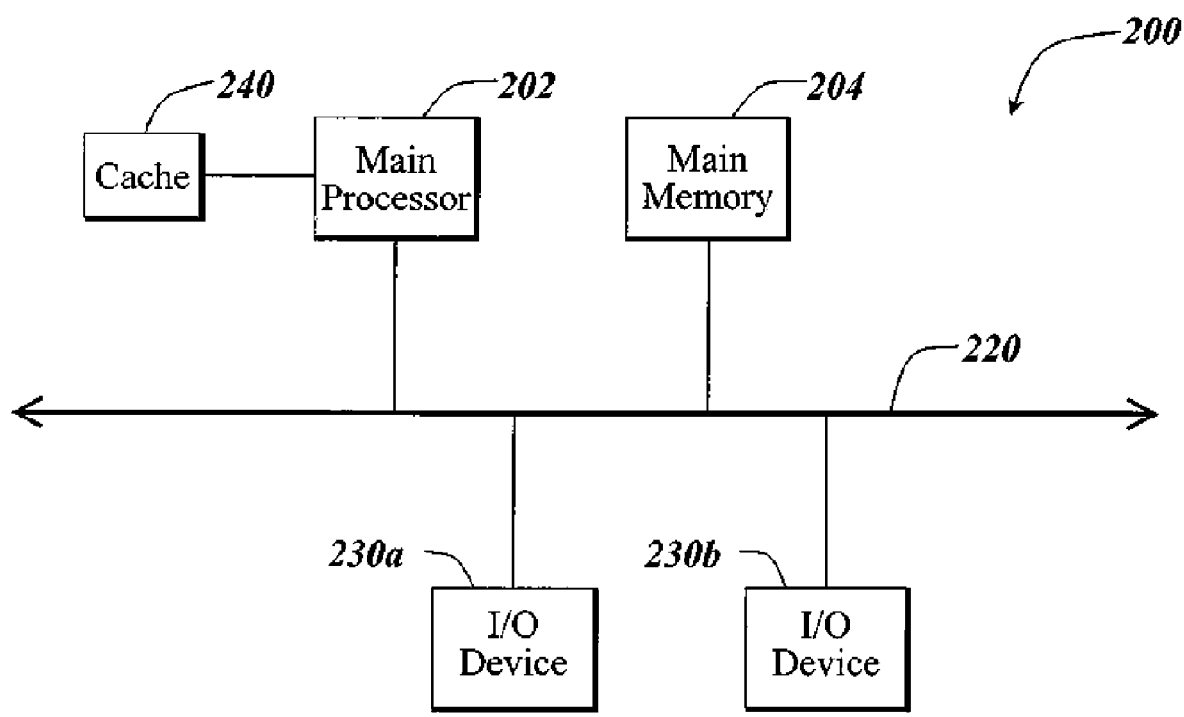
FIGS. 2A and 2B are block diagrams depicting embodiments of computers useful in connection with the present invention.
Figure 2B:
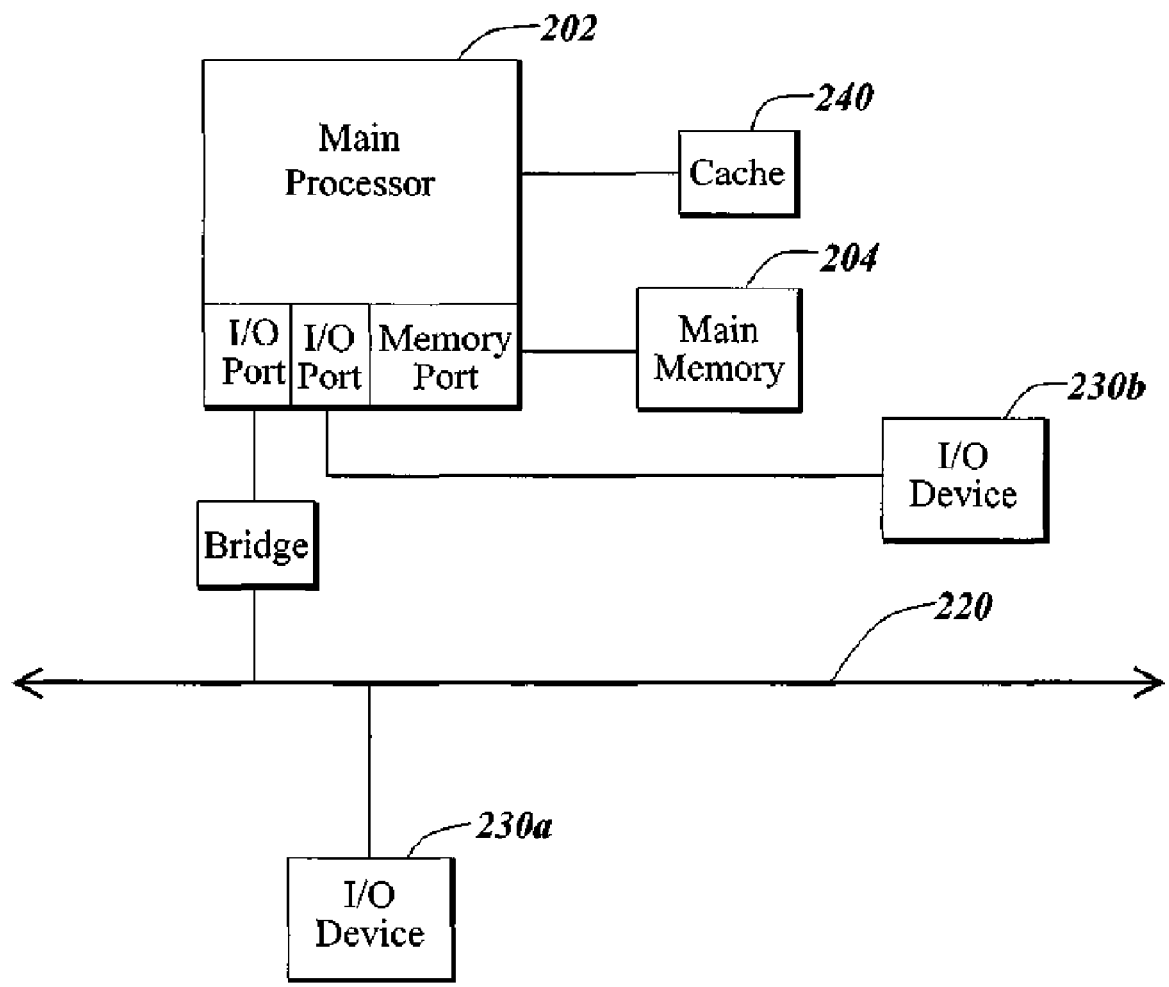

In many embodiments, the client system 4 and server 12 are provided as personal computer or computer servers, of the sort manufactured by the Hewlett-Packard Corporation of Palo Alto, Calif. or the Dell Corporation of Round Rock, Tex. FIGS. 2A and 2B depict block diagrams of a typical computer 200 useful as the client system 4 and server 12. As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various buses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 2A and 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the device in communication with the client system 24 is a mobile device, the client device may be a JAVA-enabled cellular telephone, such as the i50sx, i55sr, i58sr, i85s, i88s, i90c, i95cl, or the im11000, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In other embodiments in which the device 24 in communication with the client system is mobile, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the device 24 in communication with the client system 4 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif., the ViewSonic V36, manufactured by ViewSonic of Walnut, Calif., or the Toshiba PocketPC e405, manufactured by Toshiba America, Inc. of New York, N.Y. In still other embodiments the device in communication with the client system 24 is a combination PDA/telephone device such as the Treo 180, Treo 270 or Treo 600, all of which are manufactured by palmOne, Inc. of Milpitas, Calif. In still a further embodiment, the device in communication with the client system 24 is a cellular telephone that operates under control of the PocketPC operating system, such as the MPx200, manufactured by Motorola Corp.

Figure 3:
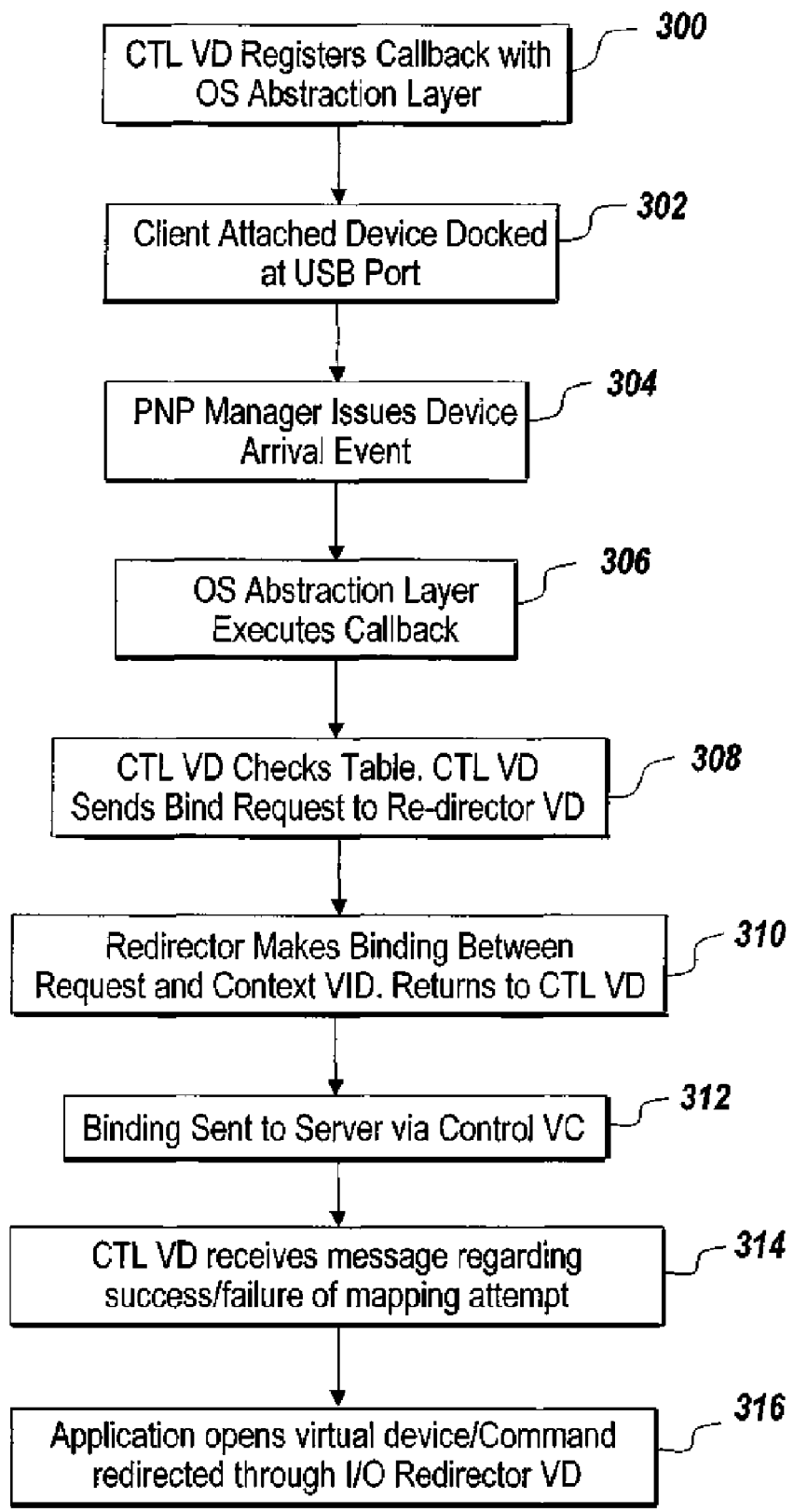
FIG. 3 is a flowchart of one embodiment of the sequence of steps followed by the present invention to re-direct device generated events detected at a client system to a server system using a presentation level protocol.

As previously mentioned, the illustrative embodiment of the present invention re-directs to a server 12 plug and play events and other types of events such as emulated plug and play events generated about the device in communication with the client system 24. The events are redirected over a network 10 using a presentation level protocol. FIG. 3 is a flowchart of the client-side sequence of steps followed by an embodiment of the present invention to redirect to an existing user session on a server a detected event caused by a device 24 in communication with the client system 4. Although, the description contained herein discusses the re-direction of detected plug and play events (and emulated fake plug and play events) it should be understood that other types of events may also redirected without departing from the scope of the present invention.

The client-side sequence of steps in FIG. 3 begins with the Control VD 40 registering a callback to be notified of certain events with the OS abstraction layer 31 (step 300). The callback may specify that the Control VD 40 is only interested in certain device classes that generate an event. Alternatively, the callback registration may request that the Control VD 40 be notified only in the case of a particular type of event (e.g.: device arrival and removal). Similarly, the Control VD 40 may request that it be notified only of events that are generated by devices connected to a particular port (e.g.: only notify for devices connected to a USB port). Those skilled in the art will recognize that additional or other parameters may be specified in the callback registration. When a device in communication with the client system is docked at a USB port (step 302), the PNP manager 34 issues a device arrival event (step 304) which is intercepted by the OS abstraction layer 31. The event notification includes information such as a GUID for the device (a globally unique ID), a vendor ID, a product ID, the type of event and a device name. Upon intercepting the event notification, the OS abstraction layer 31 determines if a registration exists for the detected event, and, if so, executes a callback to the Control VD 40 informing the Control VD of the occurrence of the event for which it registered. The callback passes the event information to the Control VD (step 306).

Upon receiving the callback, the Control VD 40 queries a table to identify a redirector VD (CCM VD 42) and sends a Bind request to the redirector VD (CCM VD) (step 308). The CCM VD 42 provides a logical COM port number for the Virtual Communication Channel (referred to as a COM context or virtual context herein) and binds it to the event information indicated in the request (GUID, Vendor ID, Product ID, Device Name, etc.). The bound request is returned to the Control VD 40 (step 310). The binding (the event information plus the COM context for the Virtual Communication Channel 48) is then sent to the server 12 (step 312). The Control VD 40 receives response from the server 12 indicating the success or failure of the mapping of the virtual device in the respective session (step 314). Upon failure, the Control VD 40 notifies the CCM VD 42 to unbind the virtual context. In the event of a successful mapping operation, subsequently, the CCM VD 42 receives a command from an Application 22 running in a user session 16, 18 and 20 on the server 12 that is addressed to the Redirector VD/CCM VD 42 at the virtual context. For example, the command may be a command to open the referenced virtual COM port assigned in the binding process (the virtual COM number represented by the COM context) to the device in communication with the client system Once the virtual COM port has been opened, subsequent I/O requests for the device in communication with the client system are received on the virtual COM port referenced in the binding (step 316).

Figure 4:
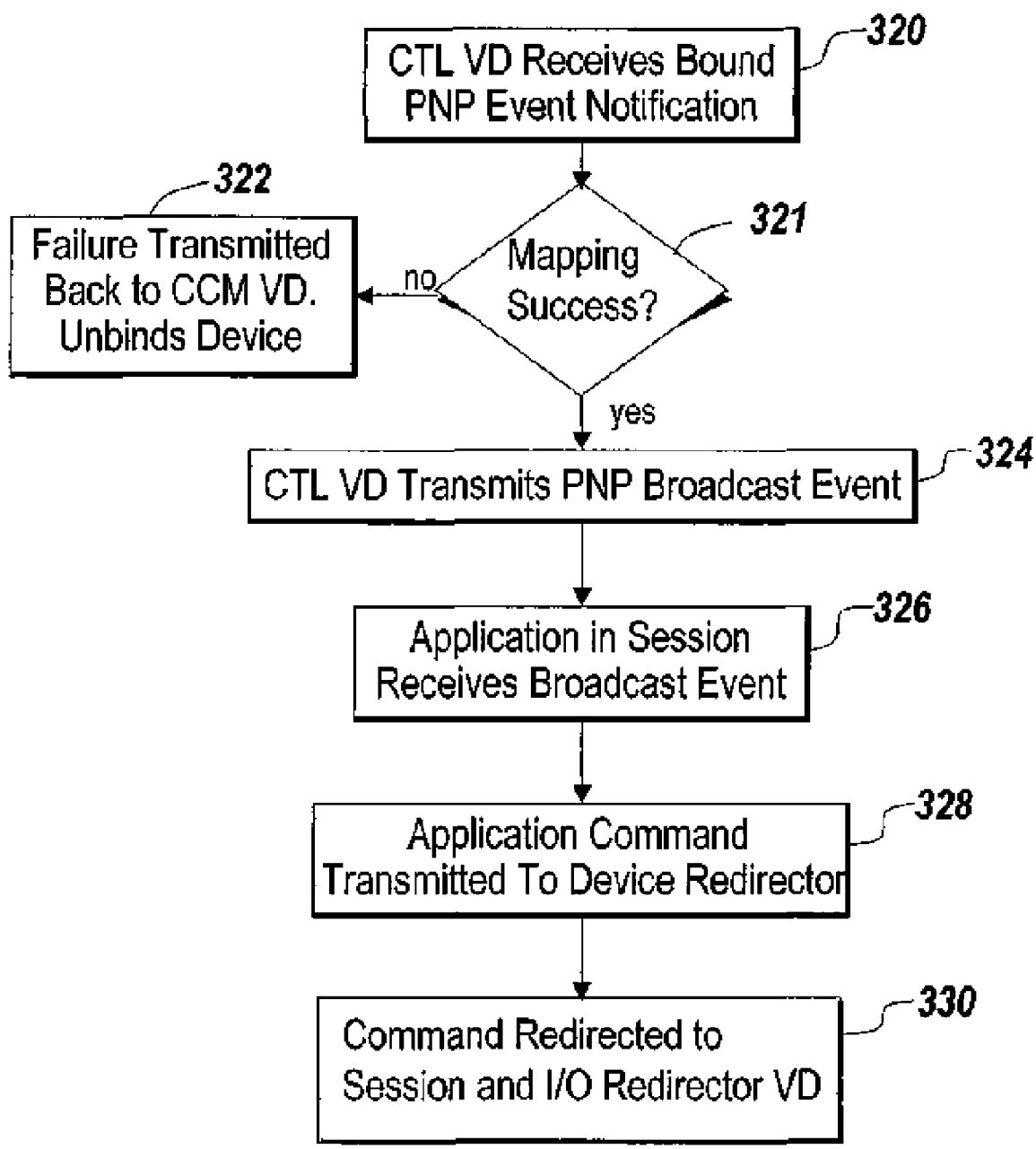
FIG. 4 is a flowchart of one embodiment of the sequence of steps followed by a server in the present invention to handle the events detected in FIG. 3.

FIG. 4 is a flowchart of one embodiment of the sequence of steps followed by a server in the present invention to handle the events detected in FIG. 3. The sequence begins when the Control VD 46 on the server 12 receives the bound PNP event notification (step 320). The Control VD then requests the device in communication with the client system be mapped into the session. (step 322). The details of the mapping request are discussed further in reference to FIG. 5 below. If the mapping request fails (step 321), a failure message is transmitted back to the CCM VD 42 so that the device can be unbound (step 322). If the mapping request succeeds (step 321), the CTL VD 46 broadcasts the PNP event within the current session (step 324). In another embodiment, the PnP device registration API is intercepted on the server 12, and only apps that have registered for PnP events are notified. An application 22 within the session receives the PNP broadcast event (step 326) and sends an Open command to the server OS referencing the virtual device bound into the event notification (step 328). The server OS, with the help of the I/O Manager 54 and Object Manager 58, and based on the syntax of the symbolic link established in the mapping (step 322), redirects it to the Device Redirector 50 (step 328), which in turn redirects it to the corresponding session and I/O Redirector VD, again based on the syntax of the symbolic link (step 330). The steps taken by the application 22 to send a command to the device in communication with the client system are discussed further in FIG. 6 below. The command may be an "Open" command and be directed to the particular COM communication port. The command is forwarded to the I/O Redirector VD (CCM VD) 42 on the client side for further processing where execution of the command will be attempted.

Figure 5:
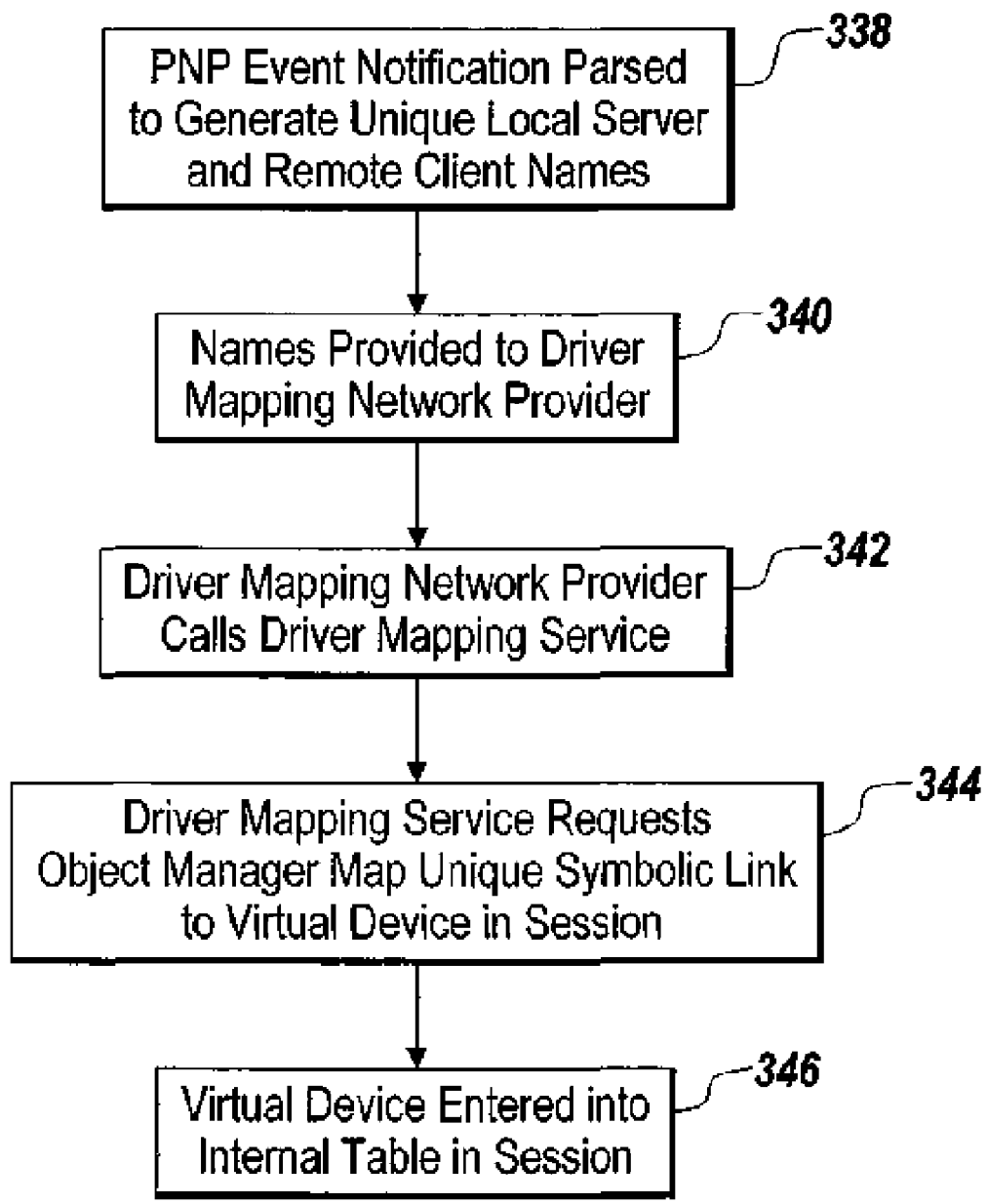
FIG. 5 is a flowchart of one embodiment of the sequence of steps followed by the present invention to map a virtual device to a user session.

The mapping process engaged in by the server-side presentation-level protocol supporting architecture 14 is now discussed in further detail. FIG. 5 depicts the sequence of steps followed by an embodiment of the present invention to map the received event notification to a virtual device in an existing user session. The sequence begins following the server side Control VD 46 receiving the bound PNP event notification and requesting mapping of the virtual device into the user session (step 320 of FIG. 4). The CTL VD 46 generates unique names for the server and remote client using the information in the event notification (Step 338). The unique name for the server may be based on the information received in the event notification, the GUID, virtual context, or context ID. The unique name for the remote client may be based on the virtual context (VD name and context). The CTL VD 46 loads the driver mapping network provider module 52 and provides the unique names (step 340). The network provider module 52 places an RPC call to the driver mapping service module 56 (step 342). The driver mapping service 56 generates a path for the virtual device and requests the Object Manager 58 create a symbolic link to the virtual device in the user session 16 using the name information (step 344). The symbolic link is entered into an internal table in the session (step 346). The I/O Manager 54 will later use the first part of the symbolic link information to perform redirection. The server-side Control VD 46 then broadcasts a PNP notification within the session which includes the symbolic link to the virtual device (step 324 of FIG. 4). Those skilled in the art will recognize that although a broadcast by the Control VD of the event notification has been discussed above, a callback registration process by which applications register within the session to be notified of the occurrence of a specified event may also be employed without departing from the scope of the present invention. In such a case, only those applications within the session that previously requested notification of the occurrence of the specified event would be notified following the mapping of the virtual device within the session.

Figure 6:
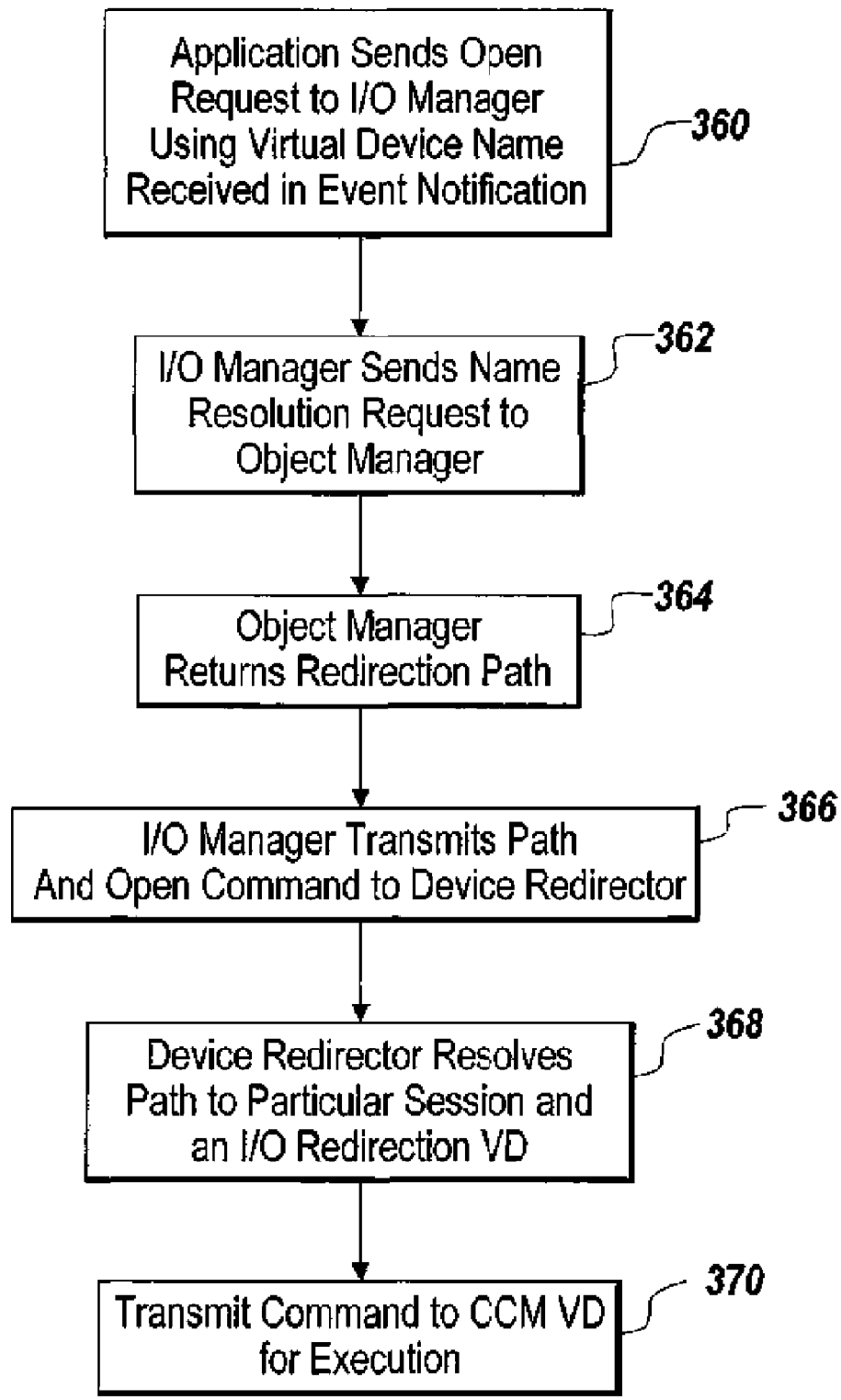
FIG. 6 is a flowchart of one embodiment of the sequence of steps followed by the present invention to send a command from an application instance executing within a session to a virtual device communicating with a client system that has been mapped to the user session.

After the device in communication with the client system has been mapped into the user session 16 and the event notification broadcast within the session, applications running within the session are able to respond to the event. FIG. 6 is a flowchart depicting the sequence of steps followed by an embodiment of the present invention to respond to an event notification. Upon receiving the PNP event notification, the application 22 attempts to open a local device name of the device so that commands and data may be sent to the device. The sequence begins with the Application 22 sending an Open command to a local I/O manager 54 (step 360). The I/O manager 54 sends a name resolution request to the Object Manager 58 (step 362). The Object Manager 58 returns a redirection path to the I/O manager 54 (step 364) which forwards the Open command and the redirection path to the Device Redirector 50 (step 366). The Device Redirector 50 resolves the path to a particular session and an I/O Redirection VD 50 (CCM VD) (step 368). The Device Redirector 50 then transmits a command to the CCM VD 42 for execution (step 370). For example, the application may transmit an "open" request for virtual COM port 3, which will be transmitted to the client side I/O Redirector VD (CCM VD 42) for execution. The client CCM VD 42 will apply the Open command to the actual device bound to the virtual COM port. Once the virtual COM port is open, it will be used to transmit data between the server side application 22 and the device in communication with the client system 24 over the virtual communication channel 48. It should be understood that other commands other than "open" may be sent without departing from the scope of the present invention.

Device removal works similarly to device addition. The detected removal event is sent with a release device request to the Redirector VD 42. The Redirector VD 42 binds the COM context to the notification. The bound event is sent to the server where it is parsed. At the server, the virtual device instance is unmapped from the user session 16. The MPS sends a release command back to the CTL VD on the client system. The CTL VD forwards the release command to the CCM VD which releases the assigned COM context, and records the COM port availability.

Figure 7:
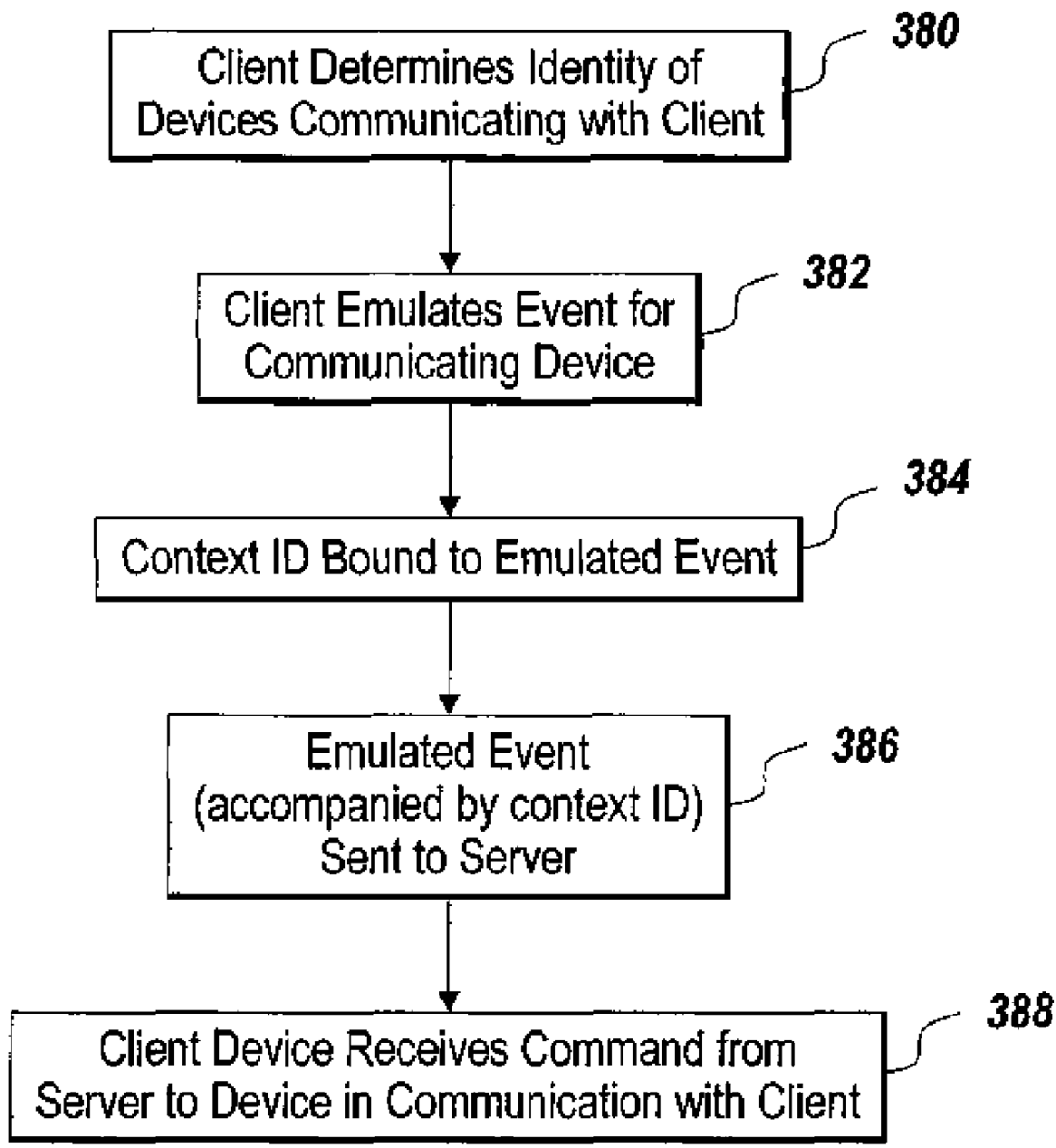
FIG. 7 is a flowchart of one embodiment of the sequence of steps followed by the present invention to emulate and re-direct device generated events at a client system to a server system using a presentation level protocol.

In addition to detecting PNP events from a device 24 communicating with the client system 4, the illustrative embodiment of the present invention also enables devices previously connected to be mapped into a user session by emulating a plug and play event and then handling the emulated event as outlined above. FIG. 7 depicts the sequence of steps followed by an embodiment of the present invention to emulate a plug and play event for a previously connected device in order to map the device into the existing user session. The sequence begins with the determination of devices in communication with the client system (step 380). This may be determined by the client system operating system enumerating the communicating devices. For each device, the client system then emulates an event (step 382). The context ID is bound to each event (step 384) as outlined above and the emulated event information, including the bound context ID is sent to the server over the control communication channel (step 386). Subsequently following the mapping of the device into the user session, the client system may receive a command from an application instance running in the user session directed to the virtual driver for the device (step 388).

The illustrative embodiment of the present invention also enables the synchronizing of a collection of data on the device in communication with the client system with a collection of data on the server. For example, the data in a user's OUTLOOK (from Microsoft Corporation) application on a PDA may be synchronized with a user's OUTLOOK data on a server using a synchronizing application executing within a user session rather than synchronizing the OUTLOOK application with data from the client system to which the PDA is communicating.

Figure 8:
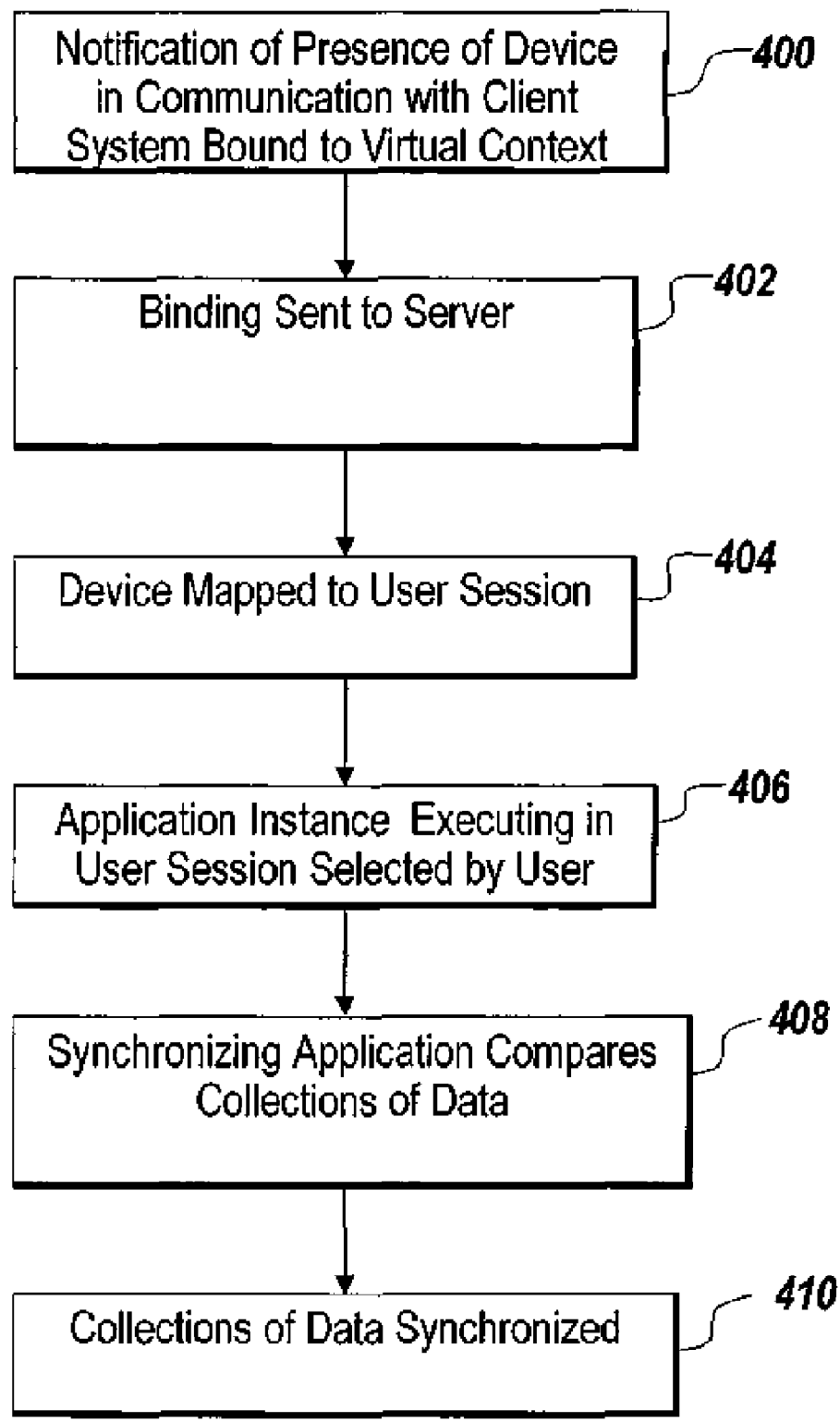
FIG. 8 is a flowchart of the sequence of steps followed by an embodiment of the present invention to synchronize a collection of data on a device in communication with a client system with a collection of data on a server within an existing user session.

FIG. 8 depicts the sequence of steps followed by an embodiment of the present invention to synchronize a collection of data on a device in communication with a client system with a collection of data on a server within an existing user session. The sequence begins with the notification of the presence of a device in communication with a client system being bound to a virtual context at the client system as discussed above (step 400). The binding is then sent to the server (step 402) where the device is mapped to a user session (step 404). An instance of a synchronizing application which is executing in the user session is then selected by a user. The synchronizing application may be ACTIVESYNC from Microsoft Corporation, HOTSYNC from PalmOne or another type of synchronizing application. The synchronizing application then compares a specified collection of data on the device 24 in communication with the client system 4 with a collection of data accessible from the user session (step 408). For example, ACTIVESYNC may be used to synchronize a calendar in OUTLOOK on the device 24 in communication with the client system 4 with the calendar in an instance of OUTLOOK on a user desktop within the session. Once the collections of data have been compared, they are synchronized by the application (step 410).

ActiveSync is the standard Microsoft application that provides synchronization and device management for a WinCE-based PDA device (PocketPC).

ActiveSync is both session (multi-user) unaware and multi-host (multi-computer) unaware. ActiveSync processes use windows sockets for inter-process communication (IPC) between themselves, and other processes, e.g., explorer.exe, outlook.exe. Sockets are used even for communication between different threads of an ActiveSync process. A combination of local host loop-back address (127.0.0.1), and all (0.0.0.0, i.e., INADDR_ANY) are used. In addition, ActiveSync always runs on the console, as even if removed from the startup sequence, ActiveSync recreates itself in the startup the next time it is launched. Without hooking, when ActiveSync runs in multiple user sessions, socket connections collide. Even if a single ActiveSync instance is run in a remote session, collision with the local console session's ActiveSync instance occurs. Accordingly, the illustrative embodiment of the present invention hooks socket calls to avoid collisions.

Windows socket communications of ActiveSync processes and explorer.exe (in communication with ActiveSync processes only), are hooked by the present invention to avoid collisions. In session, special virtual IP address hooking and virtual loop-back address hooking are performed. The Virtual loop-back address hooking adds the session ID to the local-host loop-back address (127.0.0.1) represented as a ULONG. Virtual loop-back addresses are and have to be unique with only one address per server. Virtual loop-back addresses are also used as Virtual IP addresses. Virtual IP address hooking is performed only for non-zero ports, i.e., for local communications of ActiveSync. Socket communications are also hooked on the console.

Examples of the hooking performed by the illustrative embodiment of the present invention are set forth below.

If configured for a process, virtual loop-back address and/or virtual IP address hooking/modification may done in all of the following intercepted methods:

Bind

Virtual loop-back: If the local address is the local-host loop-back address (127.0.0.1), it is replaced with a virtual loop-back address.

Virtual IP: If the local address is INADDR_ANY (0.0.0.0 all interfaces), it is replaced with a virtual IP address.

In most implementations, the (local) port is not checked but a configuration may be added to make the replacement contingent (or not) upon the port being non-zero.

Connect

Virtual loop-back: If the remote address is the local-host loop-back address, it is replaced with a virtual loop-back address.

Virtual IP: If no local address is specified in the Connect call (INADDR_ANY), then a force-Bind is done to the virtual IP address as the local address.

Although the (local) port is not usually checked, a configuration can be added to make the replacement contingent (or not) upon the port being non-zero (Bind is not affected, since local port is zero). Bind is not forced (no explicit Bind) in case of loop-back address hooking, since, otherwise, the Winsock API returns an error "Host Unreachable".

SendTo

Same as Connect.

Accept

Virtual loop-back: If the remote address is the virtual loop-back address for the process, it may be replaced with the local-host loop-back address.

Virtual IP: No action.

Although the port is not usually checked, a configuration can be added to make the replacement contingent (or not) upon the port being non-zero.

GetPeerName (for the remote socket)

Same as Accept.

GetSockName (for the local socket)

Virtual loop-back: Same as Accept and GetPeerName, however with respect to the local address.

Virtual IP: No action, i.e., same as Accept and GetPeerName.

The explorer.exe is hooked only in a session so that it affects only local-host loop-back socket communications of explorer.exe with ActiveSync. It does not affect communications with other processes as well as remote socket communications of explorer.exe.

On the console special virtual IP address hooking is performed so that INADDR_ANY is substituted with the local host loop-back address (127.0.0.1, which is the same as virtual loop-back address for SID=0) if the port is not 0 (zero).

Those skilled in the art will recognize that other hooking operations may be performed in addition to, or in place of, those outlined above without departing from the scope of the present invention.

Figure 9A:
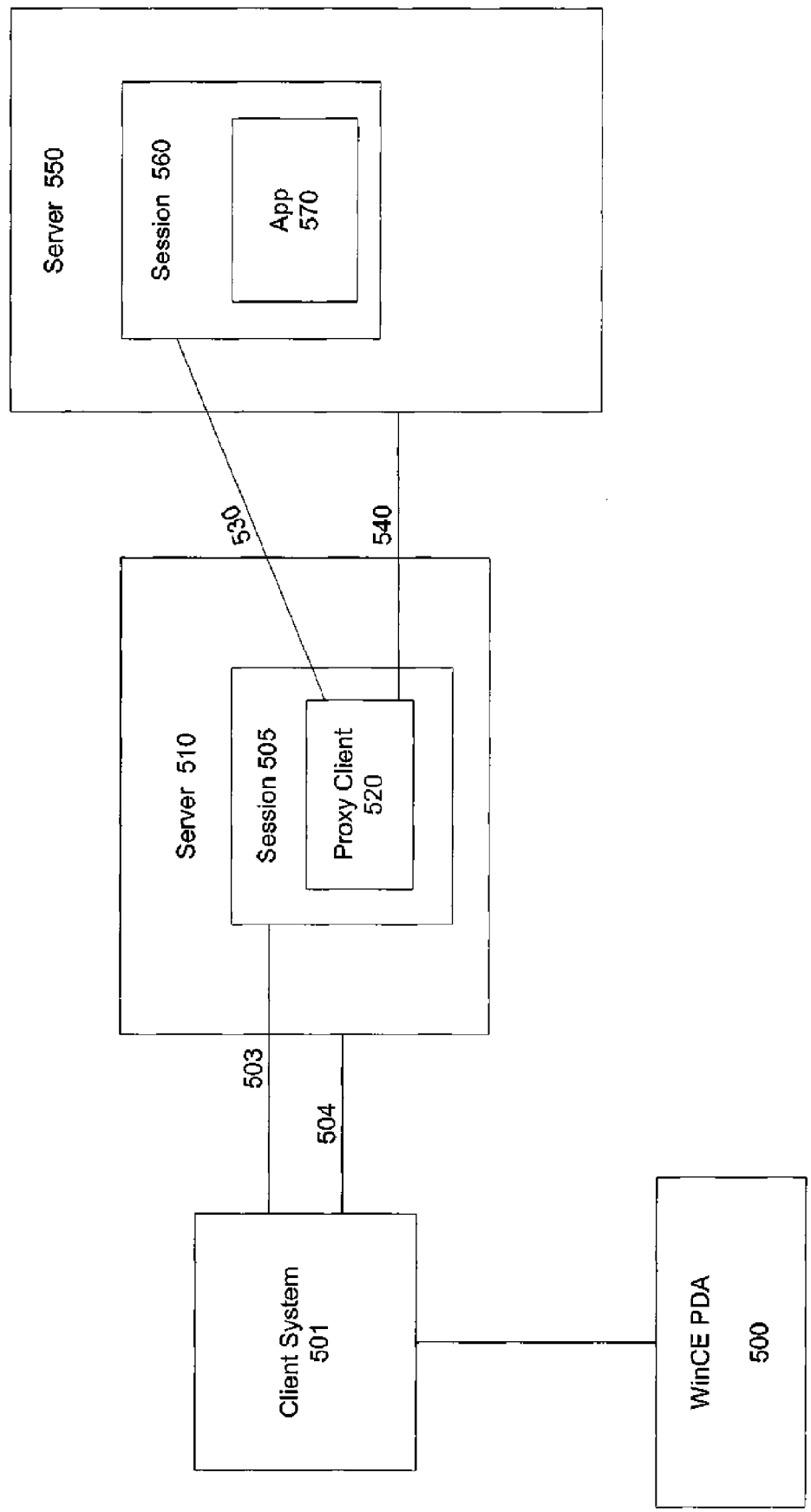
FIG. 9A is a block diagram of an embodiment of the present invention depicting the use of a proxy client in a pass-through environment.

In addition to the previously depicted client-server architecture, the illustrative embodiments of the present invention allow for a "pass-through" architecture where the device in communication with a client system that is connected over a network to a session running on a Server that is hosting a proxy client. FIG. 9A depicts a WinCE enabled PDA 500 connected to a client system 501, which accesses a proxy client 520 executing in a session 505 hosted on a server 510. The client system 501 may be an ICA client, which establishes a Control VD 503 and an I/O Redirector VD 504 with the Server 510. The proxy client 520 is connected over a network to another session 560 running on a second Server 550. The proxy client 520 may be an ICA client which establishes a control virtual channel 530 and an I/O Redirector VD 540 with the second server 550. An instance of application 570 executes within session 560. The WinCE PDA 500 may be mapped into the second server 550 consistent with the mechanisms outlined above.

Figure 9B:
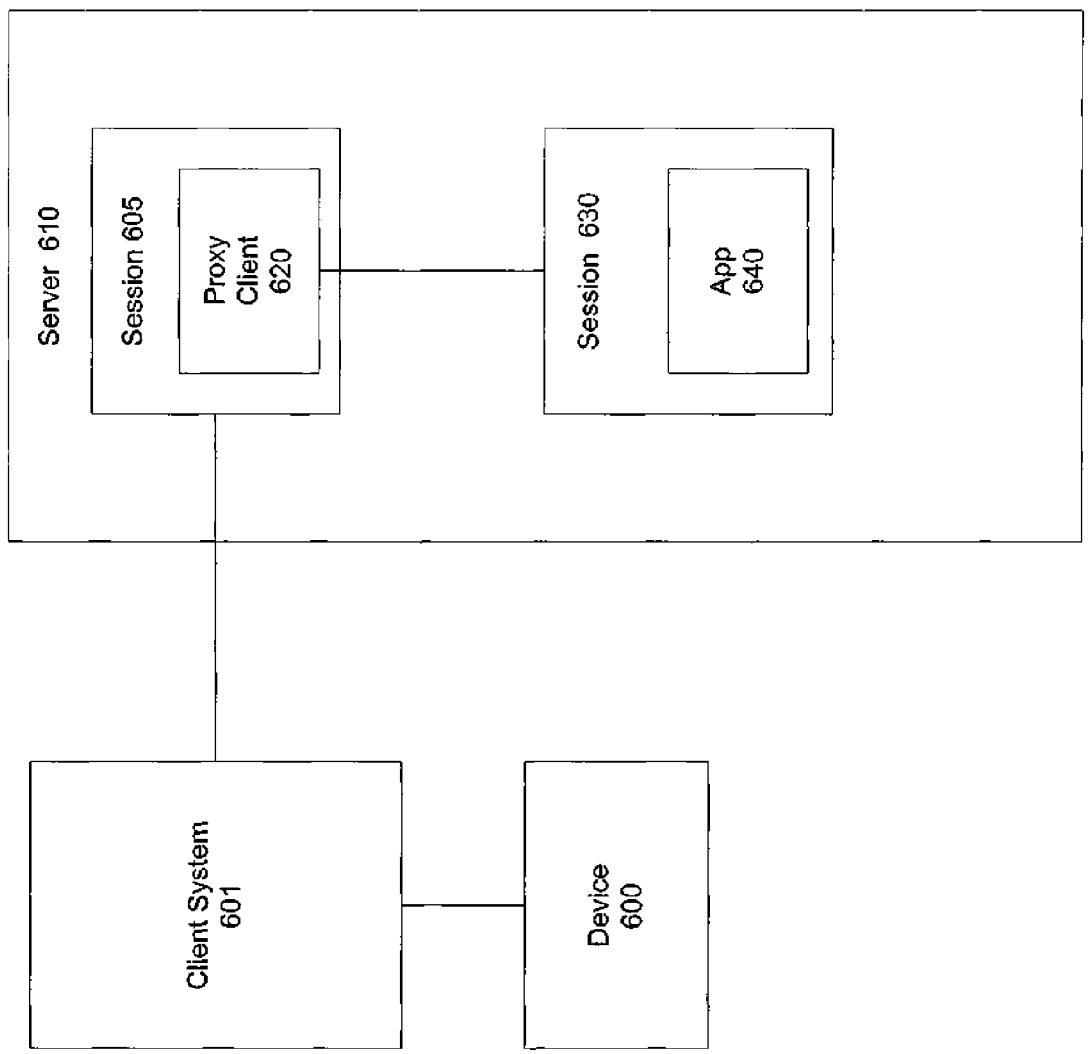
FIG. 9B is a block diagram of another embodiment of the present invention depicting the use of a proxy client in a pass-through environment where the proxy client is located on the server hosting the user session.

Similarly, FIG. 9B shows an alternative architecture where both the proxy client and user session running an instance of the application are supported by the same server. In FIG. 9B, the device 600 is in communication with client system 601, which is connected over a network to session 605 running on server 610. Session 605 runs a proxy client 620 connected to a user session 630 running on the same server 610. User session 630 includes an instance of executing application 640. Device 600 may be mapped into the user session 630 on server 610 via the proxy client 620.

In another embodiment, FIG. 9C depicts a block diagram of an embodiment of the present invention implemented without the use of a presentation-level protocol supporting architecture. In FIG. 9C, the device 700 is in communication with client system 710 which is connected over a network to server 720. Server 720 hosts an executing application 740. Events occurring at the device 700 are re-directed to the server 720 and the application 740. Those skilled in the art will recognize that additional implementations and alternative architectures are also possible within the scope of the present invention.

In another embodiment, the invention includes interception of the device enumeration methods in a server session (via a hook DLL), and their redirection (via an RPC call) to the Control VD 46 running in the server session (See FIG. 1B). The redirected methods will enumerate only devices mapped in the respective session based on the information in the internally maintained table of virtual device mappings, rather than devices attached to the server console itself. Thus an application running in a server session is able to enumerate devices that have already been mapped prior to launching of the application, i.e., devices the PnP event notifications of which the application has missed.

The present invention may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more articles of manufacture as object code.

While the invention has been shown and described with reference to specific preferred embodiments, it should be understood by those skilled in the art that various changes in form and detail may be made therein without departing from the spirit and scope of the invention as defined by the following claims.

What is claimed as new and desired to be protected by Letters Patent of the United States is:

1. A method for handling plug-and-play events occurring at a client, said method comprising:
    detecting a first event notification of a plug-and-play event generated by a plug-and-play manager regarding a device in communication with a client communicating with a server over a network using a presentation-level protocol, the first event notification comprising a globally unique ID for the device, a vendor ID, a product ID, a device name, and an event type identifier;
    intercepting said first event notification at an operating system abstraction layer prior to receipt of the notification by an application on the client;
    redirecting said first event notification to the server from the client;
    creating an association between (i) a virtual device in a user session on the server and (ii) the device in communication with the client;
    generating a second event notification of a plug-and-play event in the user session for the virtual device, the second event notification including the created association;
    receiving a command directed to the virtual device from an application executing in the user session on the server and in response to the second event notification;
    determining the command is directed to the device in communication with the client, responsive to the created association;
    forwarding the command to the client;
    opening a virtual communication channel between the device in communication with the client and the application executing in the user session on the server; and
    receiving at the client via the virtual communication channel, in response to the redirection of the first event notification, a command from the server, the command directed to said device.

2. The method of claim 1 wherein redirecting said first event notification further comprises:
    generating a context identifier, said context identifier representing a virtual COM port;
    binding the context identifier to the event notification; and
    transmitting the bound context identifier and event notification to the server.

3. The method of claim 1 wherein redirecting said first event notification includes redirecting said event notification via a virtual channel.

4. The method of claim 1, wherein receiving a command from the server further comprises:
    receiving from a server a command including a generated context identifier;
    identifying the device using the context identifier; and
    issuing a command to the identified device.

5. The method of claim 1 wherein said first event notification is generated as a result of a device arrival.

6. The method of claim 5 wherein said command is an open command.

7. The method of claim 1 wherein said first event notification is generated as a result of a device removal.

8. The method of claim 7 wherein said command is a close command.

9. The method of claim 1 wherein the device in communication with the client uses one of the USB (Universal Serial Bus) protocol, IEEE 1394 protocol, Bluetooth protocol, wi-fi protocol, wireless protocol, and infrared (IR) protocol to communicate with the client.

10. The method of claim 1, further comprising: creating a server-unique name to identify the device connected to the client that generated the event notification, said server unique name used in mapping the device to the server user session.

11. The method of claim 1 wherein redirecting further comprises: transmitting the first event notification to applications communicating with the server.

12. The method of claim 1 wherein redirecting further comprises: transmitting the first event notification only to applications communicating with the server which have previously registered a callback for a type of event causing the first event notification.

13. The method of claim 1 further comprising:
emulating a plug-and-play event notification regarding a device in communication with the client.

14. The method of claim 13 wherein the emulated event notification received from the client is received over a virtual channel.

15. The method of claim 1 wherein detecting a first event notification comprises:
detecting a first event notification of a plug-and-play event regarding a device communicating with the client via a USB connection on the client.

16. A system for handling plug-and-play events occurring at a client, said system comprising:
a client communicating with a server over a network using a presentation-level protocol;
means for detecting a first event notification of a plug-and-play event generated by a plug-and-play (PnP) manager regarding a device in communication with the a client communicating with a server over a network using a presentation-level protocol, the first event notification comprising a globally unique ID for the device, a vendor ID, a product ID, a device name, and an event type identifier;
means for intercepting said first event notification at an operating system abstraction layer prior to receipt of the notification by an application on the client;
means for redirecting said first event notification to the server from the client;
means for creating an association between (i) a virtual device in a user session on the server and (ii) the device in communication with the client;
means for generating a second event notification of a plug-and-play event in the user session for the virtual device, the second event notification including the association;
means for receiving a command directed to the virtual device from an application executing in the user session on the server and in response to the second event notification;
means for determining the command is directed to the device in communication with the client, responsive to the created association;
means for forwarding the command to the client;
means for opening a virtual communication channel between the device in communication with the client and the application executing in the user session on the server; and
means for receiving at the client via the virtual communication channel, in response to the redirection of the first event notification, a command from the server, the command directed to said device.

* * * * *

UNITED STATES PATENT AND TRADEMARK OFFICE
CERTIFICATE OF CORRECTION

| | | |
|---|---|---|
| PATENT NO. | : 7,702,750 B2 | Page 1 of 1 |
| APPLICATION NO. | : 10/711647 | |
| DATED | : April 20, 2010 | |
| INVENTOR(S) | : Georgy Momchilov and Ryan Best | |

It is certified that error appears in the above-identified patent and that said Letters Patent is hereby corrected as shown below:

Title page, item [75] INVENTORS:

The first inventor should be listed as below:

Georgy Momchilov, Coconut Creek, FL (US)

Signed and Sealed this
Fourth Day of October, 2011

David J. Kappos
*Director of the United States Patent and Trademark Office*